(12) United States Patent
Getty et al.

(10) Patent No.: US 6,395,252 B1
(45) Date of Patent: May 28, 2002

(54) METHOD FOR THE CONTINUOUS PRODUCTION OF HYDROGEN

(75) Inventors: John Paul Getty, Knoxville; Mark T. Orr, Kingsport; Jonathan Woodward, Kingston, all of TN (US)

(73) Assignee: Ut-Battelle, LLC, Oak Ridge, TN (US)

( * ) Notice: Subject to any disclaimer, the term of this patent is extended or adjusted under 35 U.S.C. 154(b) by 30 days.

(21) Appl. No.: 09/675,870

(22) Filed: Sep. 29, 2000

(51) Int. Cl.⁷ .................................................. C01B 3/08
(52) U.S. Cl. ..................... 423/657; 423/648.1; 423/658; 429/12
(58) Field of Search ............... 423/648.1, 652, 423/653, 657, 658; 429/12

(56) References Cited

U.S. PATENT DOCUMENTS

| | | | | |
|---|---|---|---|---|
| 3,017,250 A | * | 1/1962 | Watkins ....................... | 423/657 |
| 3,979,505 A | * | 9/1976 | Seitzer ....................... | 423/657 |
| 4,547,356 A | | 10/1985 | Papineau ..................... | 423/659 |
| 5,510,201 A | | 4/1996 | Werth ......................... | 429/17 |
| 5,629,102 A | * | 5/1997 | Werth ......................... | 429/13 |
| 5,643,352 A | * | 7/1997 | Werth ......................... | 75/255 |

OTHER PUBLICATIONS

Scully, J.C., "The Fundamentals of Corrosion," Pergamon Press 2nd Ed, Elmsford, N.Y. (1975).
Greenbaum, E., "Biophotolysis of Water: The Light Saturation Curves," Photobiochem. Photophys., 8, 323–332 (1984).
Wilson, J. G. et al, General & Inorganic Chemistry, 2nd Ed., Cambridge University Press, New York, N.Y. (1970).
Craig, B.D. et al, Handbook of Corrosion Data, 2nd Ed., ASM International, Materials Park, OH (1997).
Marcus, P. and Oudar, J., Corrosion Mechanism in Theory and Practice, Marcel Dekker, New York, N.Y. (1995).
Alberty, R.A. et al, "First Law of Thermodynamics," Physical Chemistry, 5th Ed., John Wiley & Sons, New York, N.Y. (1992).
Solomons, T.W.G., Organic Chemistry, 5th Ed., John Wiley & Sons, New York, N.Y. (1992).
Haruyama, S. and Masamura, K., "The Dissolution of Magnetite in Acidic Perchlorate Solutions," Corros. Sci. 18 (1978), pp. 263–274.
Mancey, D.S.; Shoesmith, D.W.; Lipkowski, J.; McBride, A.C.; and Noel, J., "An Electrochemical Investigation of the Dissolution of Magnetite in Acidic Electrolytes," J. Electrochem. Soc., 140 (3) (1993), pp. 637–642.
Stroh, H.H. and Kuchenmeister, W., "Heats of Combustion Sugar Derivatives," Z. Chem., Verbrennungswarmen von Zuckerderivaten, 4 (11) (1964), pp. 427–428.

* cited by examiner

*Primary Examiner*—Steven P. Griffin
*Assistant Examiner*—Maribel Medina Sanabria
(74) *Attorney, Agent, or Firm*—Shelley L. Stafford

(57) ABSTRACT

The present invention is a method for the continuous production of hydrogen. The present method comprises reacting a metal catalyst with a degassed aqueous organic acid solution within a reaction vessel under anaerobic conditions at a constant temperature of $\leq 80°$ C. and at a pH ranging from about 4 to about 9. The reaction forms a metal oxide when the metal catalyst reacts with the water component of the organic acid solution while generating hydrogen, then the organic acid solution reduces the metal oxide thereby regenerating the metal catalyst and producing water, thus permitting the oxidation and reduction to reoccur in a continual reaction cycle. The present method also allows the continuous production of hydrogen to be sustained by feeding the reaction with a continuous supply of degassed aqueous organic acid solution.

13 Claims, 15 Drawing Sheets

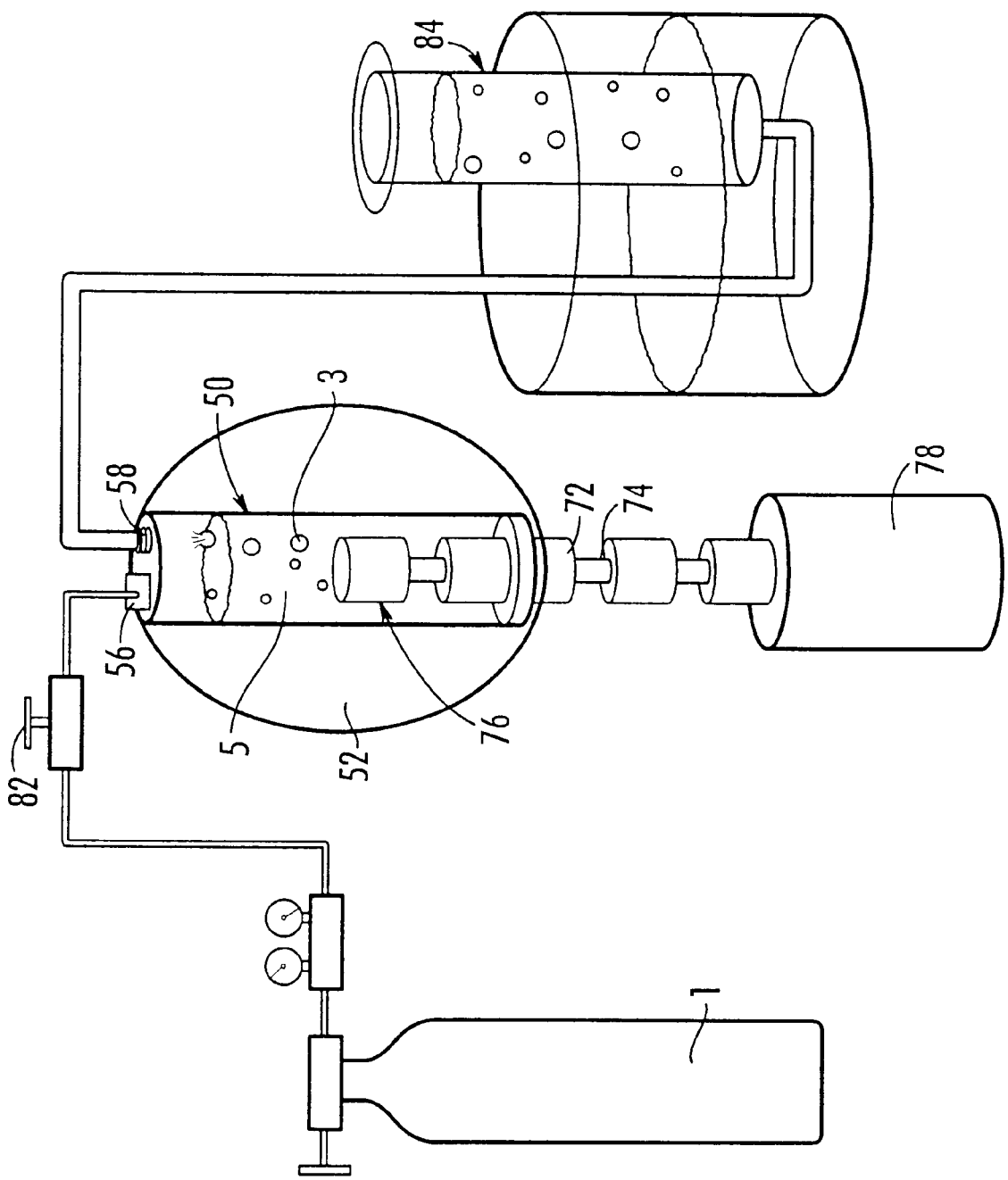

METHOD FOR THE CONTINUOUS PRODUCTION OF HYDROGEN

The invention was made with government support under contract No. DE-AC05-96OR22464 awarded by the United States Department of Energy to Lockheed Martin Energy Research Corporation; and the government has certain rights in the invention.

FIELD OF THE INVENTION

The present invention relates to a method for the production of hydrogen, and more particularly to the continuous production of hydrogen under anaerobic conditions using metal as an active catalyst.

BACKGROUND OF THE INVENTION

The use of hydrogen as an alternative fuel or power source is receiving wide attention in both political and technical arenas. There is a need for the efficient production of hydrogen for use as a fuel in both vehicular and stationary engines and fuel cell systems. One reason for this attention lies in the ability of hydrogen to burn cleanly without producing any toxic by-products. While hydrogen is a clean and renewable energy resource, it is both expensive to produce in a pure form and unsafe to store in quantity due to its combustibility. Moreover, hydrogen is expensive and heavy when stored in containers of practical size.

It is known that electropositive elements with a greater negative standard electrode potential than hydrogen displace hydrogen from water or aqueous solutions of acid or alkali. This principle forms the basis of metal displacement reactions used in the preparation of hydrogen in the laboratory. However, because the metal is consumed during the reaction, this process is cost prohibitive. Also, the conversion rate of the reaction is extremely low unless the water or aqueous solution has been heated to very high temperatures which results in a low overall efficiency and thus it has no current practical commercial utility. Therefore, it is not a practical method of hydrogen production from an industrial point of view. If the metal could be regenerated easily, then such metal displacement reactions could have practical uses beyond preparation of hydrogen in the laboratory.

One example of generating hydrogen based upon the reaction is disclosed in U.S. Pat. No. 4,547,356 by Papineau. Papineau suggested that hydrogen may be generated by the catalytic decomposition of steam at temperatures of 1000° to 2000° F. (540° to 1094° C.) to form hydrogen and supposedly oxygen. Papineau contends temperatures, the steam will disassociate in the presence of "a catalyst of a web-like cellular structure defined by interconnected metal filaments comprising iron, copper, silver, nickel, palladium, platinum, or iron-nickel and molybdenum" and that the hydrogen can then be separated from the oxygen with a diffusion-based separation membrane, e.g. palladium. Water or steam is thermodynamically incapable of decomposing into hydrogen and oxygen within the stated temperatures. Papineau continues to assert that more hydrogen will be produced by the process than will be required for reactivating the catalyst when it has become deactivated because of use.

Another example of generating hydrogen based upon this same reaction is disclosed in U.S. Pat. No. 5,510,201 by Werth. Werth disclosed a system for generating hydrogen at a faster rate by reacting particles of an activated iron reactant with heated water (up to 450° C.) in a fluidized bed-type reactor. The reaction results in an increased rate of hydrogen production along with spent metal oxide particles. Werth's method and system utilizes the heated water to reduce the metal oxide back to metal to recharge the system.

OBJECTS OF THE INVENTION

Accordingly, it is an object of the present invention to provide a new and improved method for the continuous production of hydrogen at a low cost.

It is a further object of the present invention to provide a new and improved method for the continuous production of hydrogen which is easy and relatively inexpensive to regenerate.

It is still a further object of the present invention to provide a new and improved method for the continuous production of hydrogen to be used as a clean fuel source that continually feeds fuel to an energy-producing device such as a heat engine or a fuel cell.

Further and other objects of the present invention will become apparent from the description contained herein.

SUMMARY OF THE INVENTION

In accordance with one aspect of the present invention, the foregoing and other objects are achieved by a method for the continuous production of hydrogen comprising reacting a metal catalyst with a degassed aqueous solution of an organic acid within a reaction vessel under anaerobic conditions at a constant temperature of $\leq 80°$ C. and at a pH ranging from about 4 to about 9. The reaction forms a metal oxide when the metal catalyst reacts with the water component of the organic acid solution while generating hydrogen, then the organic acid solution reduces the metal oxide thereby regenerating the metal catalyst and producing water, thus permitting the oxidation and reduction to reoccur in a continual reaction cycle.

BRIEF DESCRIPTION OF THE DRAWINGS

In the drawings:

FIG. 13 is a schematic of the apparatus for measuring hydrogen production yields, rates by total gas collection.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention is based on sustainable hydrogen evolution by the reaction between a metal catalyst such as iron powder and water under anaerobic conditions in the presence of an organic acid such as gluconic acid. Iron is an active catalyst for the production of hydrogen gas under anaerobic conditions. In a moderately heated environment at ambient pressure, a degassed solution of an organic acid, such as gluconic acid dissolved in de-ionized water at close to neutral pH, is placed in contact with a metal catalyst such as iron powder and stirred continuously. Molecular hydrogen gas evolves from the reaction. The mechanism is given below:

$$3\ Fe + 4\ H_2O \rightarrow Fe_3O_4 + 8\ H^+ + 8e^-  \quad Eq.\ 1$$

$$8\ H^+ + 8\ e^- \rightarrow 4\ H_2$$

The organic acid reduces the iron oxide formed and is recycled back to iron with the concomitant production of water molecules. The iron catalyst is thus restored and molecular hydrogen production becomes a continuous process.

$$Fe_3O_4 + 8\ C_6H_{11}O_7 \rightarrow 3\ Fe + 4\ H_2O + 8\ C_6H_{10}O_7  \quad Eq.\ 2$$

Figure 1:
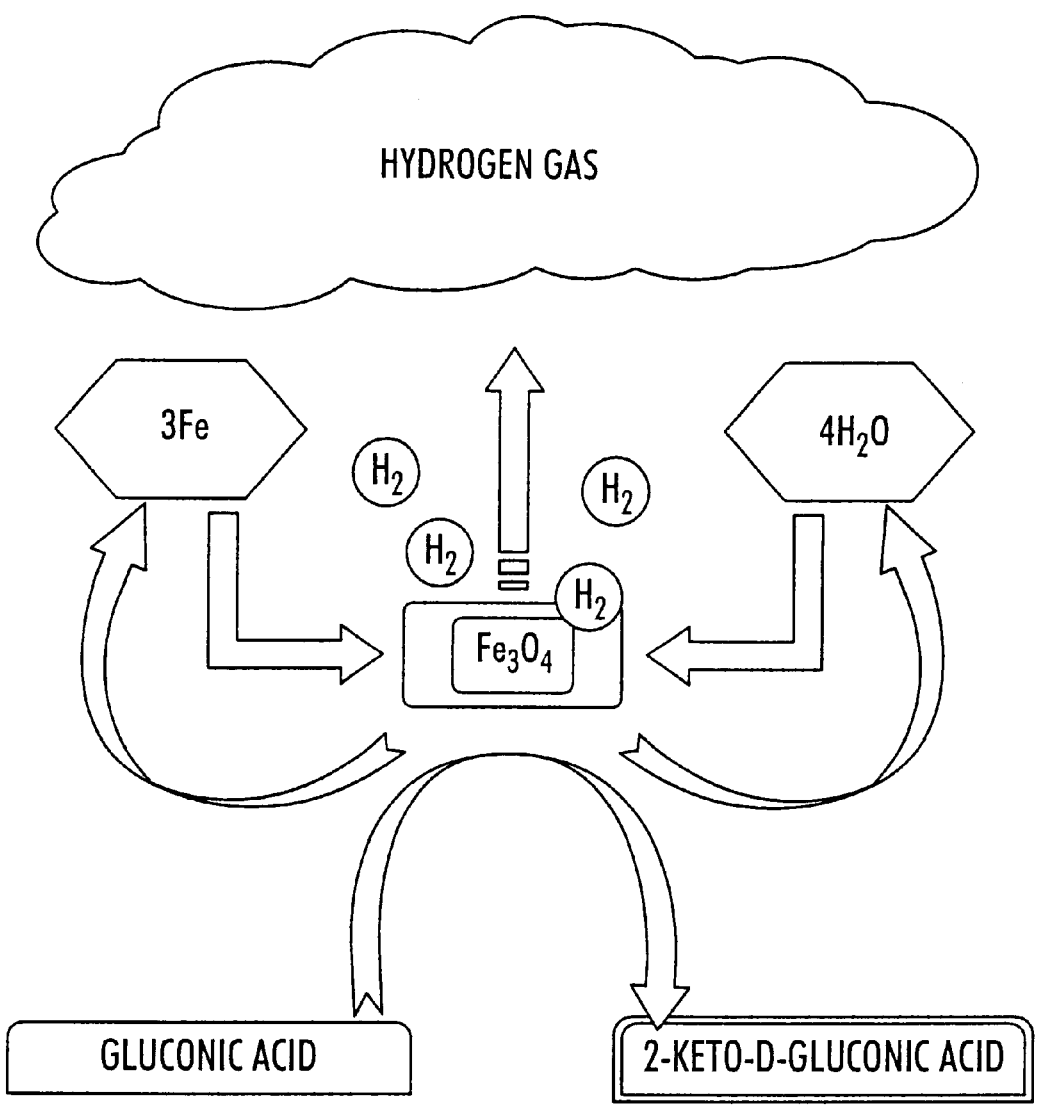
FIG. 1 illustrates the hydrogen production process via iron catalyst.

Gluconic acid (Sodium Gulconate) $C_6H_{10}O_7Na$ 2-keto-D-Gluconic acid $C_6H_{10}O_7$ Gluconic acid is a renewable organic acid by virtue of its formation from sugar glucose (the most abundant source of carbon available) and is consumed during the process as it regenerates the iron catalyst necessary for molecular hydrogen production, FIG. 1. The standard free energies of these reactions are thermodynamically favorable.

Metal catalysts that can be used for Applicant's process include iron, aluminum, tin, copper, nickel and other metallic materials. Organic acids that can be used include gluconic acid, ascorbic acid, oxalic acid, citric acid, succinic acid, acetic acid and other organic acids that are comparable to gluconic acid in nature.

The generation of hydrogen was measured and analyzed in a specially constructed flow system as described below. For all experiments and EXAMPLES, iron powder was purchased from Aldrich (Milwaukee, Wis.), gluconic acid was from Sigma Chemical Co. (St. Louis, Mo.) and molecular sieves from Aldrich (Milwaukee, Wis.).

System for Hydrogen Analysis

Figure 2:
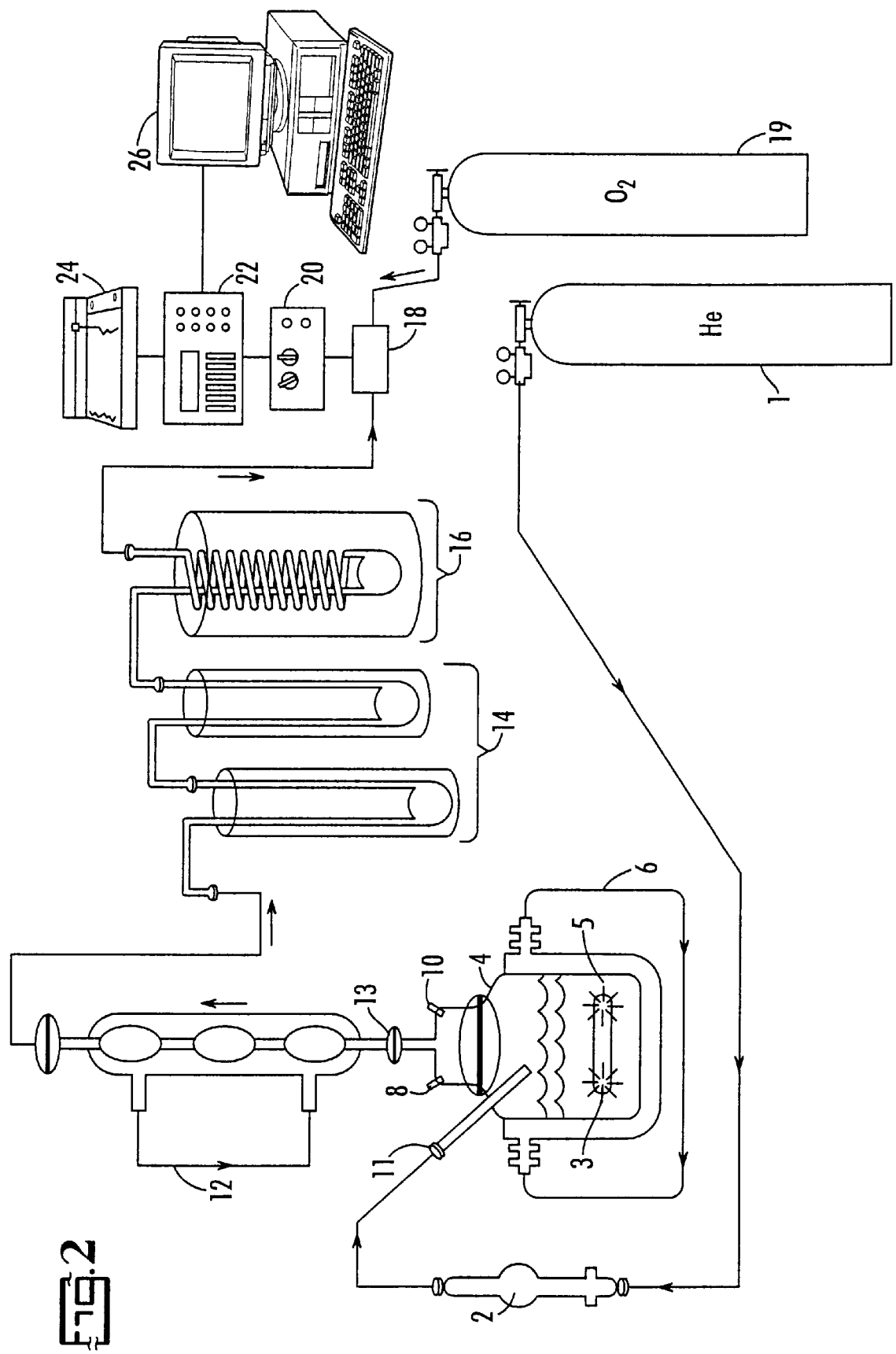
FIG. 2 is a schematic of the apparatus for measuring rates and yields of hydrogen evolution.

The schematic diagram of FIG. 2 outlines the flow system utilized for the purposes of hydrogen gas generation and analyses. The system begins with the carrier gas, namely helium, 1. The carrier gas 1 passes through the entire system and is responsible for the transportation of hydrogen gas from the place of reaction to the sensor 18. The flow rate of the carrier gas is proportional to the sensitivity of the hydrogen sensor and is set by the user. The first carrier gas interaction takes place in the electrolysis cell 2. The electrolysis cell 2 is filled with 2 mM potassium hydroxide (KOH) and serves two purposes. The first purpose is the hydration of the carrier gas 1 in order to minimize the drying effects in the reaction vessel 4. The second purpose is electrolysis of the KOH solution resulting in hydrogen production for the calibration of the hydrogen sensor 18. The carrier gas 1 enters the reaction vessel 4 through the gas inlet 11, passes over the reaction components 3 (metal catalyst) and 5 (degassed aqueous organic acid solution) and exits the reaction vessel 4 through the gas outlet 13 (reaction vessel discussed below). FIG. 2 also illustrates the thermal heating loop 6, which is part of the thermal heating system surrounding the reaction vessel. The reaction vessel 4 has port 8 for the injection and extraction of solutions and port 10 for the insertion of a pH probe or monitoring device. The carrier gas enters the condensing chamber 12, which is in place for the minimization of reaction component evaporation. The carrier gas passes through two chilled sodium aluminosilicate microsieve drying traps 14 and one liquid nitrogen trap 16 for the removal of all gasses except hydrogen and helium. The carrier gas comes in contact with a hydrogen specific sensor 18, a tin-dioxide ($SnO_2$) semiconductor, changing the conductivity of the sensor. The oxygen reference gas 19 is applied to the sensor 18 at 100 ml/min for the restoration of the sensing element. The concentration of hydrogen present in the carrier gas determined by the change in conductivity, higher concentration equals higher conductivity. A simple electrical circuit converts the change in conductivity to an output signal. The output signal is transferred to an amplifier 20 then to a multi-meter 22. The output of the multi-meter 22 is registered on a recording chart 24 and data is collected by the computer code ASYST 26 (Technologies, Inc., Rochester, N.Y.). The data is analyzed by ASYST for hydrogen concentration and production rates.

The mechanics of the reaction vessel utilized and the kinetics explaining the catalytic abilities of the iron metal in order to generate molecular hydrogen, via consumption of renewable organic acids, are described separately.

Reaction Vessels for Hydrogen Production

Figure 3:
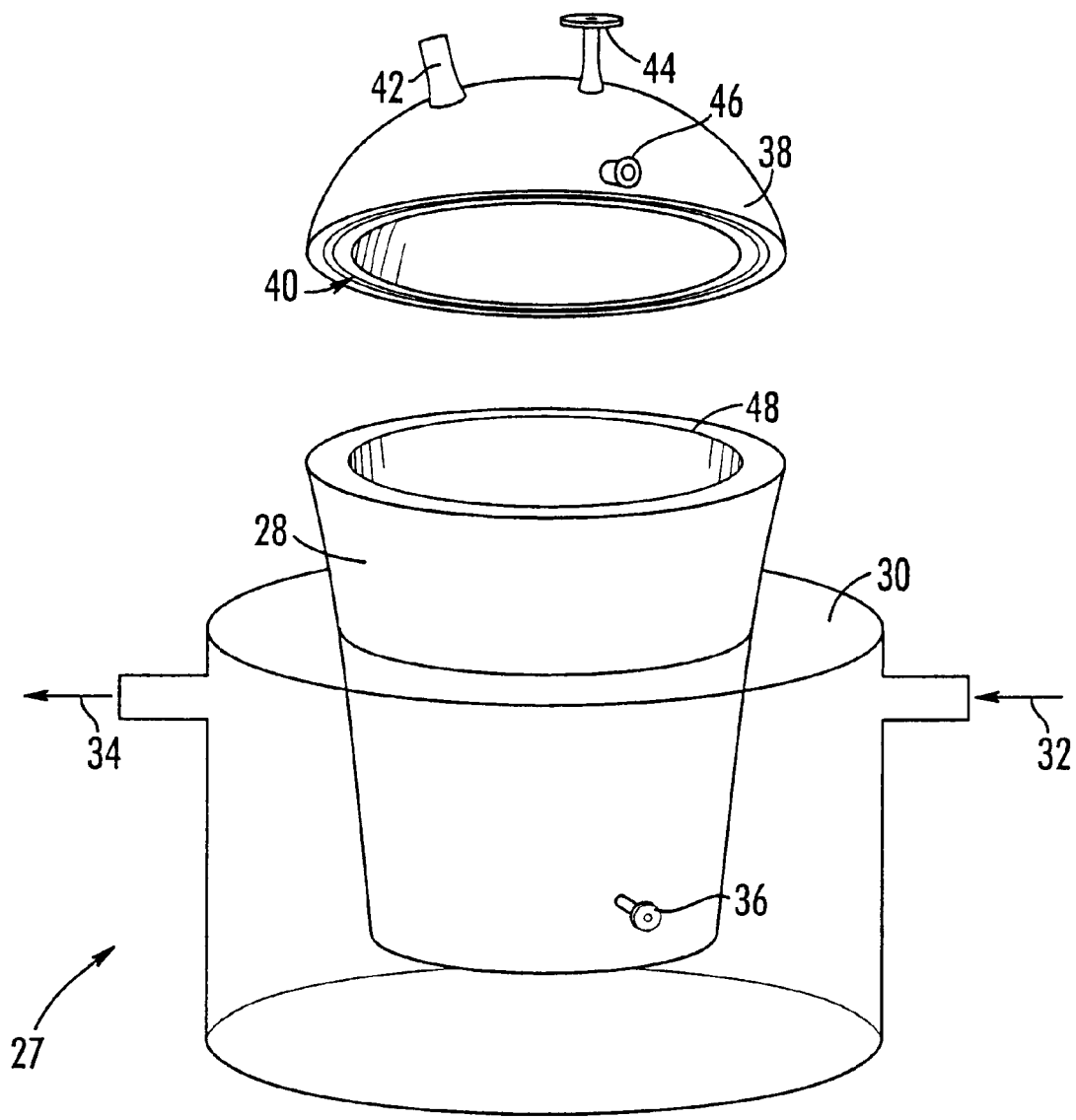
FIG. 3 shows a 15 mL reaction vessel with cover plates.

The vessel in which hydrogen generation takes place consists of several key features that support the overall reaction process, see FIG. 3. The reaction vessel 27 has two distinct parts: the main vessel body 28 and the cover plate 38. The design of the main vessel body 28 consists of an inner core chamber 48 where the reaction components are placed. The size and shape of the inner core chamber 48 is dependent on the dimensions and type of iron or metal catalyst (e.g. wire, chips, shavings, filings, powder, etc.) and the volume of organic solution(s) to be utilized. For example, the inner volume of a reaction vessel for iron wire and chips is 35 ml and for iron filings, and for iron powder, it is 15 ml.

The main vessel body 28 is enclosed by an outer core layer 30, which serves as a thermal heating system. The thermal layer 30 is present and required in order to maintain constant temperature throughout the entire hydrogen production process. The outer core layer 30 has a thermal heating jacket inlet 32 and a thermal heating jacket outlet 34. The cover plate 38 seals the inner core chamber 48 from the surrounding environment, creating a liquid/gas impermeable reaction chamber. FIG. 3 illustrates an o-ring seal 40. The vessel 27 is specifically designed to maintain an anaerobic environment at ambient pressure via the ports through which flow helium.

The 15 ml reaction vessel (FIG. 3) is equipped with four individual ports located either in the main vessel body 28 or the cover plate 38 that access the inner core chamber 48. One port is utilized for the injection and extraction of solutions 46; another is for insertion of a pH probe or monitoring device 42. The remaining two ports are for the passage of gases. One is for the influx of the carrier gas (e.g. helium) 36, and the other port is for the removal of the carrier gas as well as the generated hydrogen gas 44.

A stirring mechanism located within the reaction vessel 27 is responsible for the mixing of the reaction components (iron or other metal catalyst and organic acid solution). The stirring device is a simple Teflon-coated magnetic stirring bar that is inserted in the inner core chamber 48 and operated externally by a stirring plate, via magnetic forces (this is specific to the 15 ml reaction vessel).

Method for Hydrogen Production

Using the reaction vessel of FIG. 3 and the apparatus of FIG. 2, elemental iron or other metallic material such as aluminum, tin, copper or nickel, 3 is placed into the inner core chamber 48 of the reaction vessel 27. The reaction vessel 27 is then sealed with the cover plate 38. The internal environment of the reaction vessel 27 is purged with the carrier gas 1 for 30 minutes at a flow rate of 50 ml/min. Simultaneously, the vessel 27 is heated to about 80° C. and the condenser 12 is cooled to about 4° C. The stirring mechanism is engaged at the maximum velocity permissible by the reaction vessel 27. The electrolysis cell 2 is filled with 2 mM potassium hydroxide. The sodium aluminosilicate drying tubes 14 are placed in an ice bath and the gas trap is placed in liquid nitrogen 16. Data recording devices are set accordingly. The degassed 15 ml of 0.5 M gluconic acid solution 5, pH 7 is injected into the core chamber 48 with iron powder or metallic material 3. Other organic acids that are comparable to gluconic acid in nature such as ascorbic, oxalic, citric and succinic acids can be used as an alternative. A typical reaction mixture consists of iron powder (25 mg) and 0.5 M degassed gluconic acid solution, pH 7.0. The parameters governing the reaction and the components of the reaction may be varied for optimal results.

Effect of Reaction Parameters on Hydrogen Production

The reaction conditions that are necessary to support the kinetics responsible for metallic iron to serve as a catalyst for the generation of molecular hydrogen gas at the expense of renewable organic acids are:

Iron Mass and Surface Area Ratio

Figure 4:
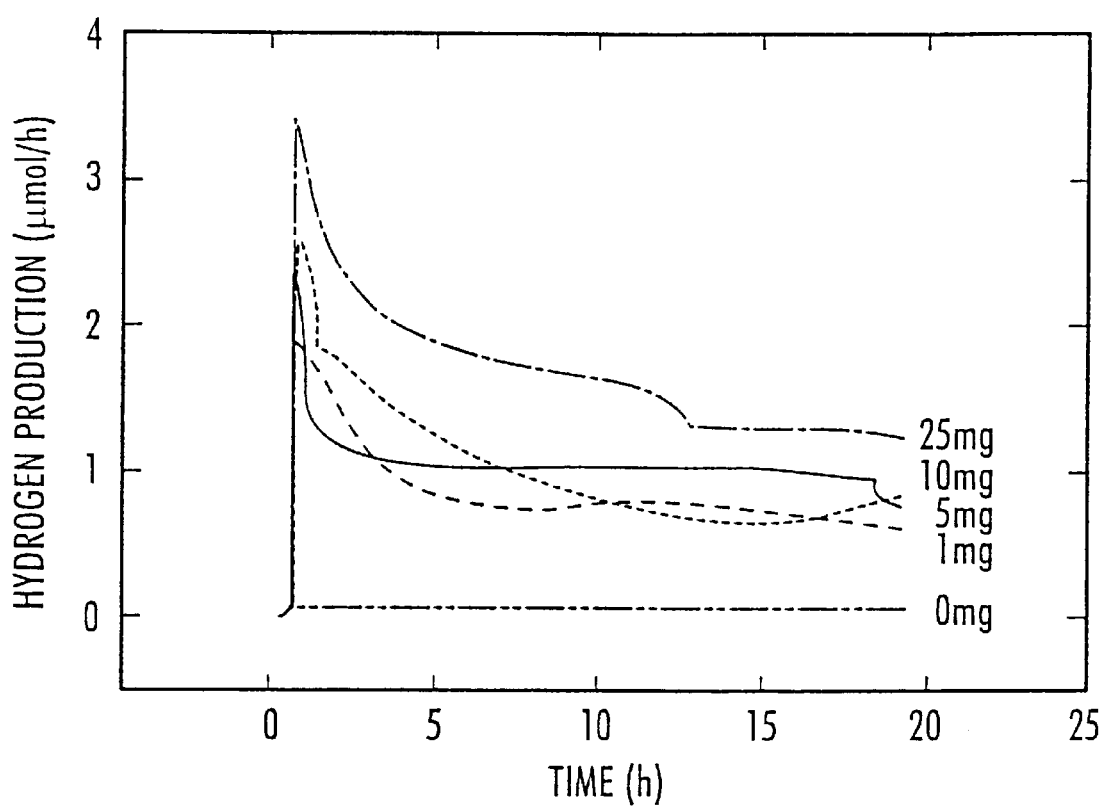
FIG. 4 shows the effect of iron powder mass on hydrogen production in 10 mM Hepes buffer degassed in nanopure water.

The generation of hydrogen gas is dependent on the amount of the iron accessible for the oxidation reaction. A significant aspect of the iron mass effect is the ratio of accessible surface area-to-mass. The greater this ratio, the greater the rate of production and overall yield of hydrogen. For example, a solid cylinder of iron weighing 10.91 grams with a surface area of 888.84 $mm^2$ produced hydrogen at a maximum rate of 0.04 $\mu$mol/hr. A sample of iron powder (10 microns) weighing 25 mg with a total surface area of 1.9E+06 $mm^2$ is capable of generating hydrogen at a maximum rate of 3.5 $\mu$mol/hr. Hydrogen production is increased with iron filings of equal mass-to-surface ratios only when the mass of the iron powder is increased (FIG. 4).

Solution Degassing

Figure 5:
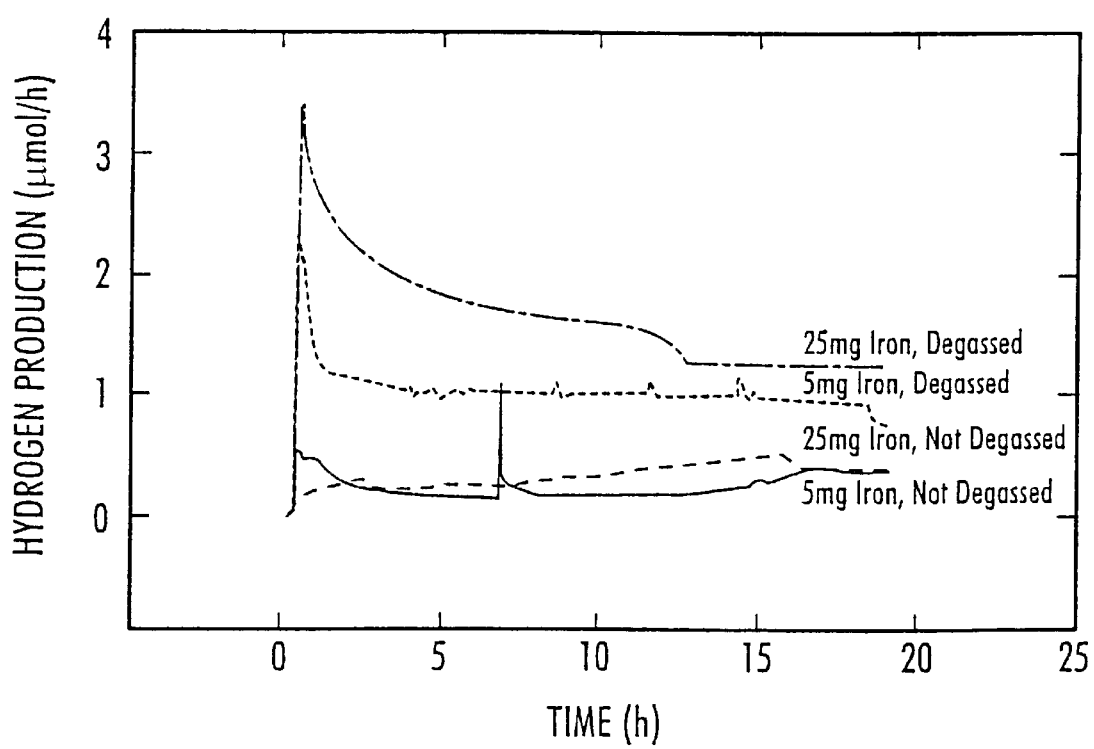
FIG. 5 shows the effect of solution degassing on rate of hydrogen production by iron powder in 10 mM Hepes buffer.

Iron oxidation is the mechanism for the generation of molecular hydrogen gas from the water component of the organic acid solution. The oxygen of the water binds to the iron and subsequently releases the hydrogen molecules. Hydrogen evolution is reduced when free molecular oxygen reacts with iron forming the iron oxide. Therefore, in order to minimize this effect, the solution is placed under vacuum and free oxygen and other gasses are removed prior to the solutions addition to the reaction vessel. The overall assists in maintaining anaerobic conditions. Degassed organic acid solutions have more than double the rates of hydrogen production when compared to the production rates with non-degassed solutions (FIG. 5). In the reaction containing 25 mg of iron powder, the non-degassed Hepes organic acid solution resulted in a peak production rate of 0.5 $\mu$mol/hr, where as the degassed solution produced hydrogen at a peak rate of 4.4 $\mu$mol/hr.

Stirring Velocity

Figure 6:
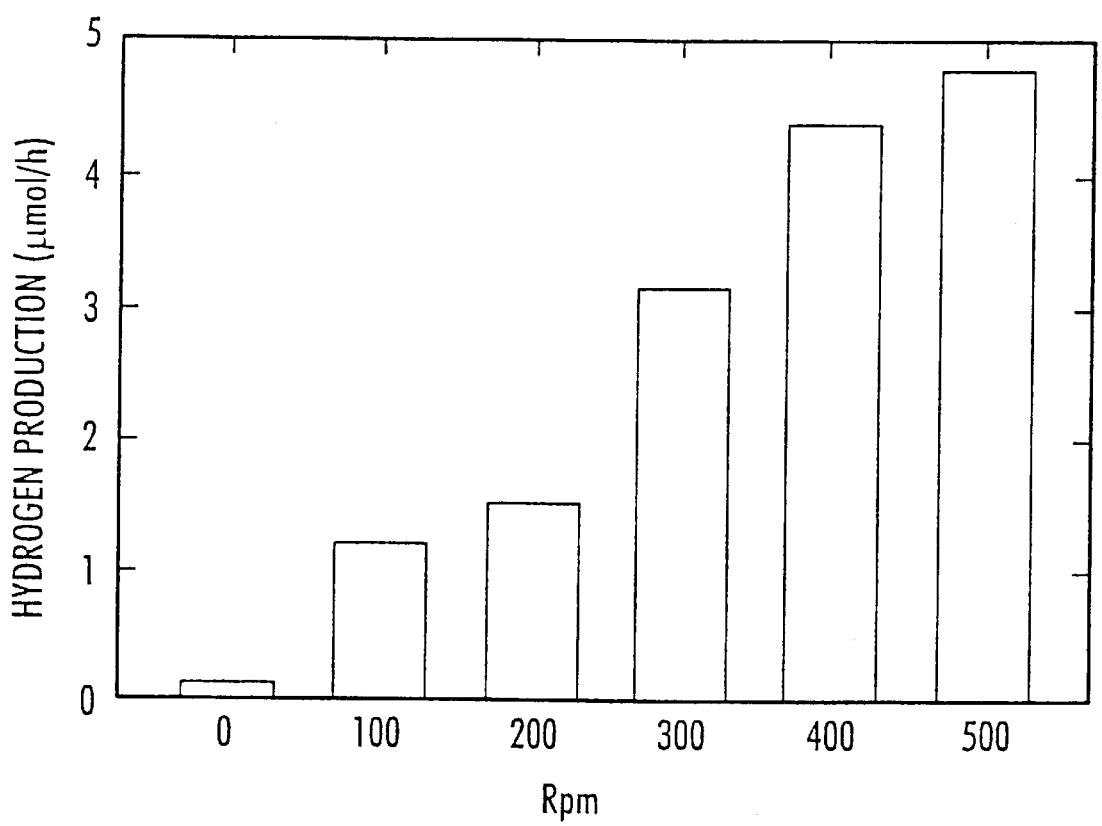
FIG. 6 shows the effect of rpm on rates of hydrogen production using 25 mg iron powder in 10 mL of degassed 1.0 M gluconic acid in nanopure water.

The rate of hydrogen gas production is dependent on the velocity of stirring. Stirring was achieved by use of a magnetic stirring bar (1") placed into the reaction vessel. The purpose of stirring is to optimize the flow rate by which the solution passes over the surface area of the iron. The iron powder adheres to the end of a magnetic stirring bar. As the bar rotates, the iron powder passes through the solution, optimizing the flow rate of the solution over the iron powder surface area. In conjunction flow of solution, the stirring process continuously mixes the solution in order to keep the organic acid concentration evenly distributed. The stirring velocity is proportional to the rate of hydrogen generation in the overall process (FIG. 6). Without stirring (0 rpm), the rate of hydrogen generation is less than 0.1 $\mu$mol/hr. With stirring (500 rpm), the rate of production approaches 5.0 $\mu$mol/hr.

Temperature

Figure 7:
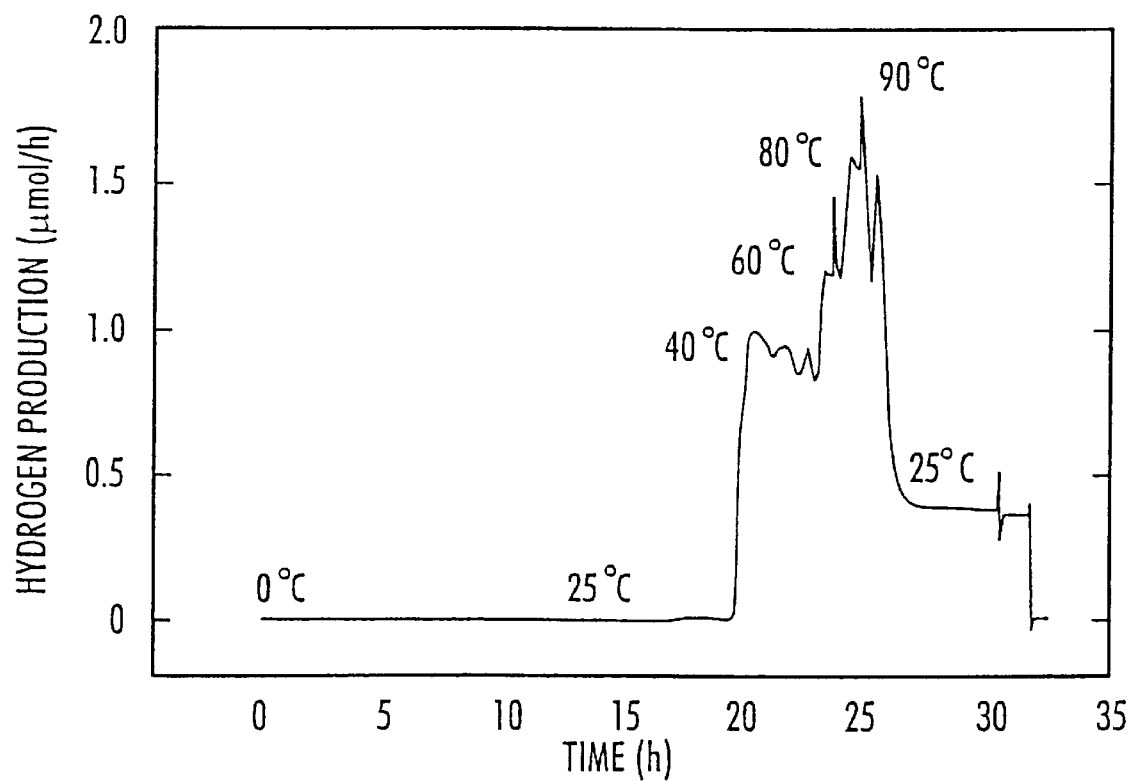
FIG. 7 shows the effect of temperature on rate of hydrogen production using 25 mg iron powder in 0.5 M degassed gluconic acid in nanopure water.

The rate of hydrogen production is dependent on the temperature on the reaction (FIG. 7). There are limitations to the acceptable temperature range that the overall reaction requires at ambient pressure in the system. Temperatures in excess of 80° C. result in solution evaporation and possible organic acid denaturing. Reactions conducted at temperatures below 25° result in little hydrogen production. Temperature selection is based on the greatest production rate and is maintained throughout the entire process.

pH Level

The degree of iron oxidation and reduction for the generation of hydrogen is dependent on the pH of the organic acid solution. Additionally, the effects of the pH are influenced by the amount of free oxygen present in solution. For example, when pH values are less than 4 to 5, iron oxidation rapidly occurs, and at higher oxygen levels the rate of oxidation increases. At these accelerated rates of oxidation (Eq 1), the process of reduction is insignificant (Eq. 2). At pH values 3 and below, such as with citric acid (pH 1.2), oxygen content is irrelevant and total iron oxidation and solubilization occur, the metal catalyst is consumed. When pH values are greater than 5 and oxygen content is exceptionally low, pure iron is resistive to oxidation in various types of water or organic acid solutions. At pH above 9, no reaction occurs. However, in the presence of gluconic acid at pH values near 7.0, iron oxidation and iron reduction processes may occur simultaneously at close to an equivalent rate perhaps. The pH level of the gluconic acid solution during the time of hydrogen production has a minimal increase of 0.1 to 0.2 in pH. The proposed increase is based on the appearance of hydroxide ions in solution.

Selection of Organic Acid

Figure 8:
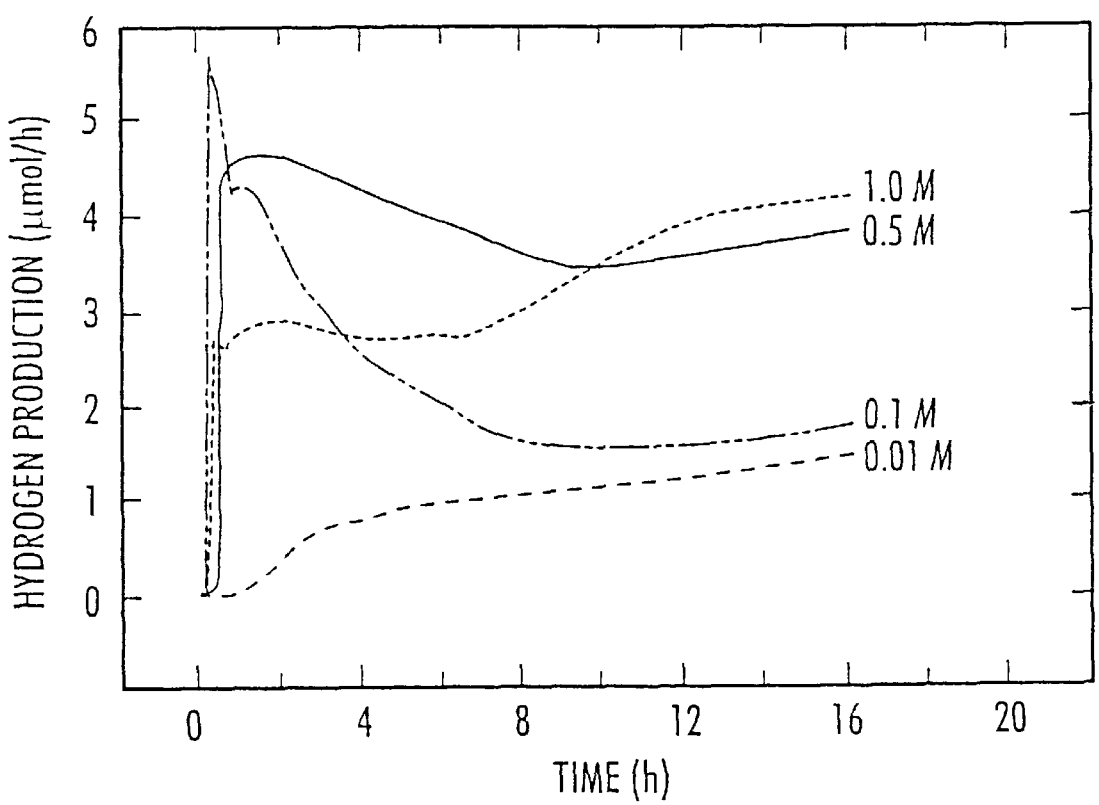
FIG. 8 shows the production of hydrogen from 25 mg iron powder in varying concentrations of degassed gluconic acid.
Figure 9:
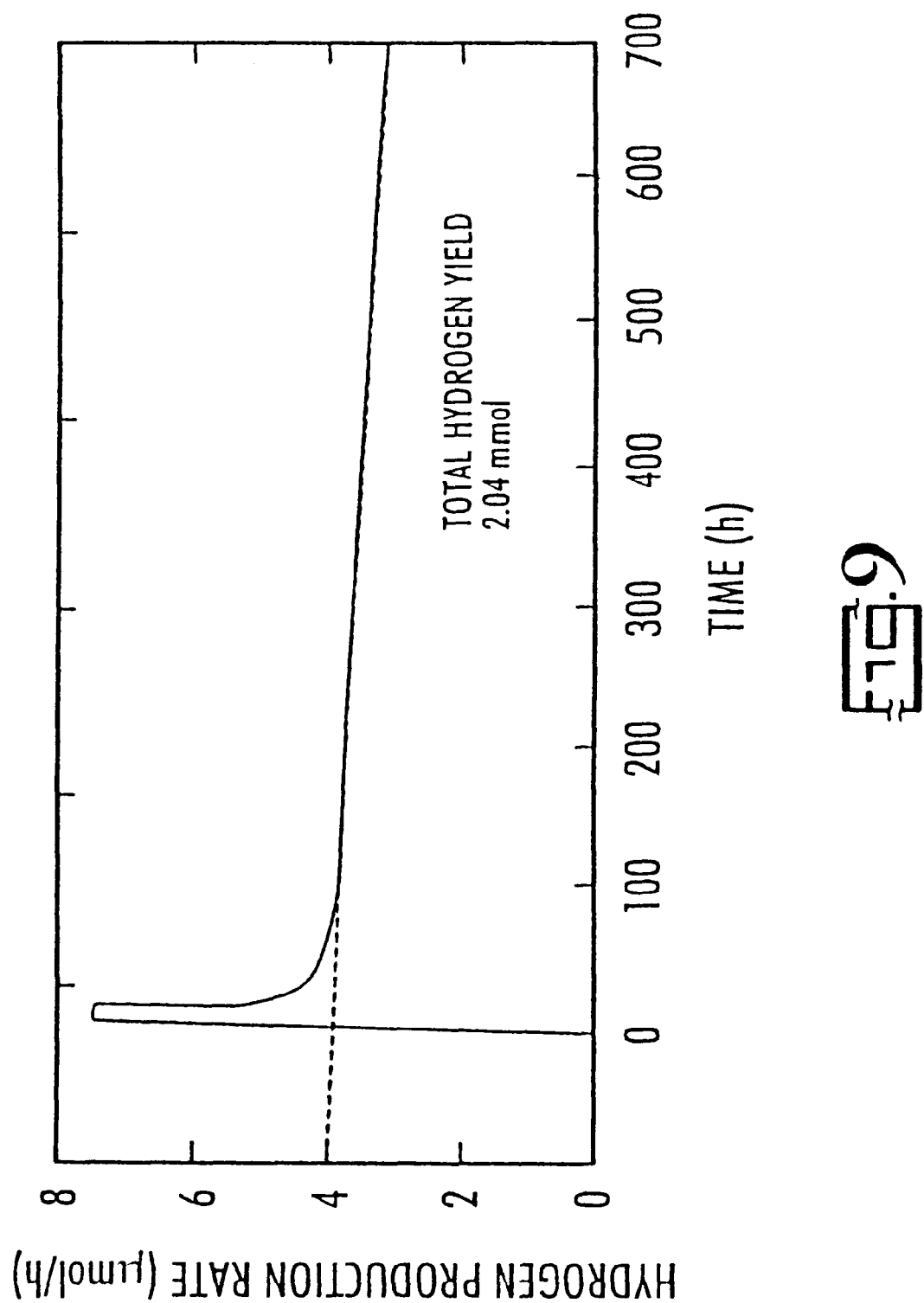
FIG. 9 shows the production of hydrogen by iron catalyst (265 mg) in 0.5 M degassed gluconic acid, pH 7.2 (15 mL).
Figure 10:
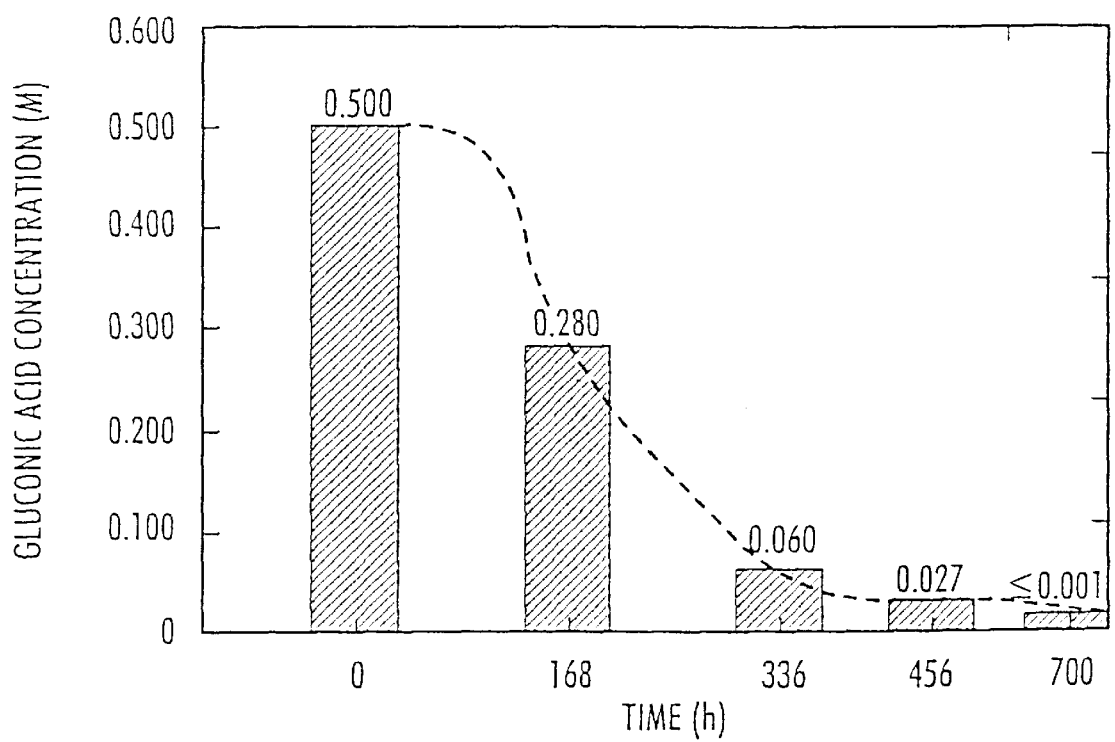
FIG. 10 shows the oxidation of gluconic acid during the production of hydrogen from iron (265 mg iron powder in 15 mL 0.5 M degassed gluconic acid, pH 7.2).

The rate of hydrogen production and subsequent yield of hydrogen is also dependent on the nature of the organic acid that is used in the reaction. The organic acid was selected based on the ability to generate hydrogen at optimal rates, achieve the greatest long-term yields and ability to sustain the catalytic properties of the iron (Table 1). Thus far, gluconic acid has proven to give optimal yields of hydrogen. The optimal concentration of gluconic acid is found to be between 0.5 to 1.0 M (FIG. 8). Greater concentrations tend to prevent the oxidation processes from occurring; whereas lower concentrations do not effectively regenerate the iron in the reduction process. This acid was able to achieve a steady production rate of 4 $\mu$mol/hr and maintain this production rate for more than 700 hours (FIG. 9). The reaction described in FIG. 9, the total yield of hydrogen was 2.04 mmol. Gluconic acid (sodium salt) has a natural pH value near 7.0 when dissolved in nanopure water. Therefore, gluconic acid has the ability to regenerate iron (reduce the iron oxide), thus sustaining the catalytic properties of iron. In the present invention, reduction of the iron oxide would consume the gluconic acid. This effect is observed as gluconic acid concentration decreases with time (FIG. 10) and the rate of hydrogen production will decrease with time as well.

TABLE 1

Production of hydrogen using 26 mg iron powder in 15 mL organic solution for 24 hr.

| Solution | Peak rate of hydrogen production ($\mu$mol/h) | Sustained rate of hydrogen production ($\mu$mol/h) |
| --- | --- | --- |
| 0.5 M Gluconic acid, pH ~7.0 | ~4.8 | ~4.1 |
| 0.5 M Absorbic acid, pH ~7.0 | ~3.5 | ~3.5 |
| 0.5 M EDTA, pH ~7.0 | ~4.2 | ~2.4 |
| 0.5 M Hepes buffer solution, pH ~7.0 | ~2.1 | ~1.7 |
| 0.5 M Glucose, pH ~7.0 | ~1.8 | ~1.2 |
| 0.5 M Glutamine, pH ~7.0 | ~4.8 | ~0.8 |
| 0.5 M Glutamic Acid, pH ~7.0 | ~4.9 | ~0.7 |
| Nanopure water, pH ~5.6 | ~4.8 | ~0.7 |
| Processed water | <0.1 | ~0.1 |
| 0.5 M Citric acid, pH ~1.2 | ~7.0 | <0.1 (under 8 h) |

Supportive Data

Several analyses were performed on the reaction components and reaction by-products during and after experiments, discussed below.

Gas Analysis

Figure 11:
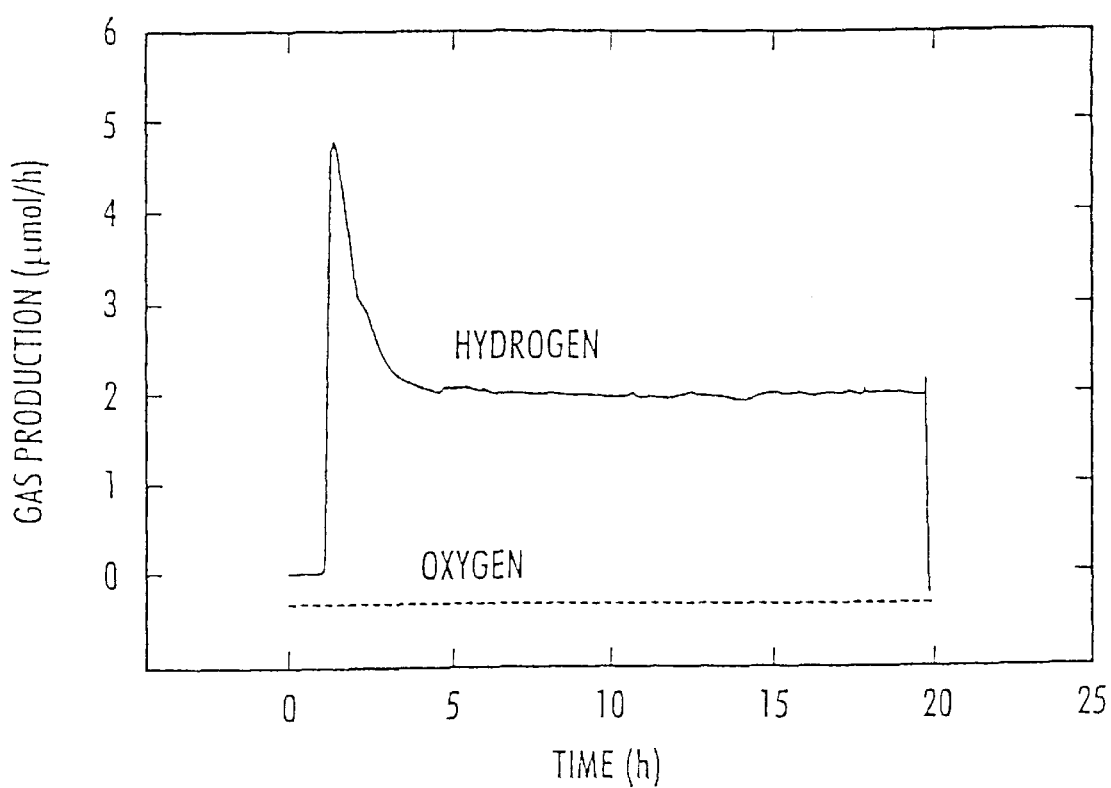
FIG. 11 shows simultaneous production of hydrogen and oxygen gases using 25 mg iron powder in 10 mL 1 mM Hepes buffer.

The process of stirring iron powder in an organic acid solution results in the generation of hydrogen gas. The present embodiment of the subject invention above concludes that during the process of hydrogen generation that no additional gases, specifically molecular oxygen, is produced in the reaction. This conclusion is based on experimental data obtained from the utilization of a galvanic cell during the actual hydrogen generating process. The galvanic cell was added to the system of hydrogen analysis immediately following the condenser and data was recorded with the aforementioned ASYST program. The placement of the galvanic cell insures that all carrier or produced gases will pass through the cell. The result of this analysis concludes that as hydrogen gas is generated, molecular oxygen is not produced nor released into the system (FIG. 11). In addition to the galvanic cell analysis for the presence of oxygen, the gas generated within the reaction vessel was analyzed. The hydrogen production reaction was performed in a closed reaction vessel (vacuum-carrier gas free), trapping all generated gases with in the system. Aliquots of the headspace gases were taken and analyzed by mass spectrometry. The gas analysis concludes that hydrogen is the only gas generated in the process of stirring iron powder in gluconic acid solution (Table 2). Hydrogen is found to occupy 70% of the volume and the other gases identified represent percentages found in background air.

TABLE 2

Analysis of head space gas

| Gas | Sample number | | |
|---|---|---|---|
| | 1 | 2 | 3 |
| Xe | <0.1 | <0.1 | <0.1 |
| Kr | <0.1 | <0.1 | <0.1 |
| $CO_2$ | 0.34 | 0.33 | 0.28 |
| Ar | 0.33 | 0.31 | 0.33 |
| $O_2$ | 4.77 | 4.53 | 4.90 |
| $N_2$ | 25.44 | 25.44 | 25.39 |
| $H_2$ | 68.82 | 70.07 | 68.8 |
| He | 0.28 | 0.30 | 0.38 |
| $CH_4$ | 0.01 | 0.01 | 0.01 |
| $C_2H_6$ | 0.01 | 0.01 | 0.01 |

Values are % composition

TABLE 3

Iron powder accountability

| Experiment type/solution | Initial iron mass (mg) | Concentration of iron in solution (mg/L) | Final iron mass (mg) | Mass difference (mg) | Percent change |
|---|---|---|---|---|---|
| Solubility/ citric acid pH 1.2 | 101.5 | ≅4482 | ≅1.079 | ≅100.4 | 98.937 |
| Solubility/ gluconic acid pH 7.0 | 101.3 | ≅69.0 | ≅99.75 | ≅1.53 | 1.507 |
| Mass balance/ citric acid pH 1.2 | 99.6 | NA | ≅0.0 | ≅99.6 | ≅100.0 |
| Mass balance/ gluconic acid pH 7.0 | 99.5 | NA | 97.94 | ≅1.55 | 1.567 |

Mass Balance-Iron Solubility Analysis

An accountability analyses was performed to determine if the iron is being consumed or if the iron is serving as a true catalyst in the oxidation/reduction processes outlined above. The first analysis conducted was the solubilization of iron powder in the presence of organic acids. An aliquot of iron powder (101.5 mg) was placed in 22.5 ml of 1.0 M degassed citric acid, pH 1.2. Ninety-nine percent of the iron powder was solubilized in the citric acid solution within 24 hours after which all hydrogen production ceased. At 96 hours the total yield of hydrogen produced was 35.83 umol. Secondly, an iron powder sample (101.3 mg) was placed in 22:5 ml of 1.0 M degassed gluconic acid solution, pH 7.4 for 96 hours. The solubility analysis reports that the concentration of iron in solution accounts for only 1.507% of the total iron powder sample (Table 3). Hydrogen produced was 388 μmol after 96 hours, but it should be noted that hydrogen generation was not complete.

Iron Mass Balance Analysis

An iron powder mass balance analysis was performed in conjunction with the iron solubility analysis. An aliquot of iron powder (99.5 mg) was placed in 22.5 ml of 0.5 M degassed gluconic acid solution, pH 7.4 at 80° C. for 96 hours satisfying the processes by which hydrogen is generated. After the reaction time, the solution was carefully removed from the reaction vessel. The remaining iron was washed several times with degassed nanopure water and dried under nitrogen gas. The residual iron powder was weighed (97.94 mg). The difference in dry weight equals a 1.567% loss of iron powder (Table 3), equivalent to the iron solubility analysis. In conventional metal displacement reactions, all the metal is consumed. Under anaerobic conditions in the presence of gluconic acid, little of the metal is consumed but hydrogen production is sustained.

Iron Oxide Analysis

Additional analyses were performed on the iron powder, before, during and after the processes of hydrogen production. Data obtained from thermal gravimetric analysis (TGA) on the iron powder prior to mixing with solution in the reaction, reports that the initial sample was 98.91% pure iron and the remaining percentage is a form of iron oxide. The TGA performed on an iron sample 100 hours after mixing in 0.5 M degassed gluconic acid solution, pH 7.4 in the reaction process, reports that 87.9% of the initial iron sample remains as pure iron and the remaining 12.1% is in the form of an iron oxide.

In support of the finds by TGA, Raman spectroscopy was employed to identify the iron oxide formed in the reaction process utilizing samples from the same reaction mixture. Raman spectroscopy analysis identified that the iron oxide as magnetite, $Fe_3O_4$.

Hydrogen Mass Balance Data

The rate and yield of hydrogen produced by the same mass of iron powder (~25 mg) under different experimental conditions was determined. The data are shown in Table 4. A typical metal displacement reaction occurs in the presence of citric acid at pH 1.2. After 24 hours in 15 ml 1.0 M or 0.1 M citric acid, pH 1.2 all the iron the maximum yield of hydrogen was 36.6 and 24.3 μmol respectively. However, after 100+ hours in 1.0 M, 0.5 M 0.1 M gluconic acid, the total hydrogen yield was 107.1, 76.1 or 17.9 μmol respectively. These values did not represent the maximum hydrogen yield possible, as the experiment had not gone to completion (i.e. hydrogen production). These data are very significant in that in the experiments with gluconic acid, little iron had been solubilized and in the case of 0.5 M and 1.0M gluconic acid, the yield of hydrogen was 2–3 fold higher than with citric acid in which all the iron dissolved. Under these conditions, therefore, sustainable hydrogen production is possible with greater yields of hydrogen than in a typical metal displacement reaction.

TABLE 4

Hydrogen mass balance

| Experimental Conditions | Hydrogen Production "Maximum rate" ($\mu$mol/h) | Total hydrogen yield ($\mu$mol/h) | Reaction complete (yes/no) | Reaction time (h) |
|---|---|---|---|---|
| 1 M Gluconic acid, pH 6.96 | 5.1 | 107.1 | No | 100 |
| 0.5 M Gluconic acid pH 7.1 | 3.8 | 76.1 | No | 100 |
| 0.1 M Gluconic acid pH 6.98 | 3.4 | 17.9 | No | 100 |
| 1 M Citric acid pH 1.2 | 12 | 36.6 | Yes | 24 |
| 0.1 M Citric acid pH 1.2 | 9.8 | 24.3 | Yes | 24 |
| Nanopure water pH 5.6 | 2.3 | 1.8 | No | 100 |

Energy Balance for the Reaction

The standard Gibbs free energy of formation ($\Delta_f G°$) was determined for the hydrogen production process involving iron powder as an active catalyst in gluconic acid solution. The complete hydrogen production reaction has an optimal yield when the system is maintained at 80° C. (a parameter previously described). The heat applied to the system serves as an activation energy requirement for the reaction. Converting the applied heat to Gibbs free energy, ~338 kJ/mol was obtained using the following equation:

$$\Delta G(kJ/mol) = \Delta_f H°(kJ/mol) - S(kJ/mol^{-1} °K^{-1}) * \Delta T(°K)$$

From Eq. 1, hydrogen production via process of iron oxidation, the Gibbs free energy was ~67 kJ/mol, based on the following equations and data presented in Table 5:

$$\Delta_f G°(\text{reaction}) = {}_f G°\Sigma(\text{products}) - {}_f G°\Sigma(\text{reactants})$$

From Eq. 2, iron catalyst regeneration via iron oxide reduction by gluconic acid, the standard Gibbs Free energy of formation was determined as accurately as possible, via bond dissociation energy calculations based on the thermodynamic data of glucose and citric acid. The Gibbs free energy was determined to be ~869 kJ/mol (Table 5).

The energy balance of the hydrogen production reactions was calculated by summing the Gibbs free energies for the heat of activation, formation for iron oxide and the reduction of the iron oxide.

$$\Delta G°(\text{reaction}) = \Delta G°(\text{heat of activation}) + \Delta G°(\text{iron oxidation}) + \Delta G°(\text{iron oxide reduction})$$

$$\Delta G°(\text{reaction}) \approx -338 + -66.7 + -869 \approx -596.7 \text{ kJ/mol}$$

The summation of the Gibbs free energy for the reaction is negative. Therefore the reaction is exothermically favorable.

The Gibbs free energy was also calculated for the combustion of the hydrogen gas. The Gibbs free energy was ~-914 kJ/mol, based on the following reaction:

$$4 H_2 + 2 O_2 \rightarrow 4 H_2O$$

The energy balance of the overall hydrogen production process, including hydrogen combustion is:

$$\Delta G°(\text{reaction}) \approx -1511 \text{ kJ/mol}$$

TABLE 5

Chemical thermodynamic data of reaction components

|  | $\Delta_f H°$ (kJ/mol) | $\Delta_f G°$ (kJ/mol) |
|---|---|---|
| Fe | 0 | 0 |
| $H_2O$ | −285.83 | −237.179 |
| $Fe_3O_4$ | −1118.4 | −1015.4 |
| $H_2$ | 0 | 0 |
| $C_6H_{11}O_7$ | −1275 | −943 |
| $C_6H_{10}O_7$ | −1433 | −1060 |
| $O_2$ | 0 | 0 |

Additional Reaction Vessel Design for Collection of Large Volumes of $H_2$

Figure 12:
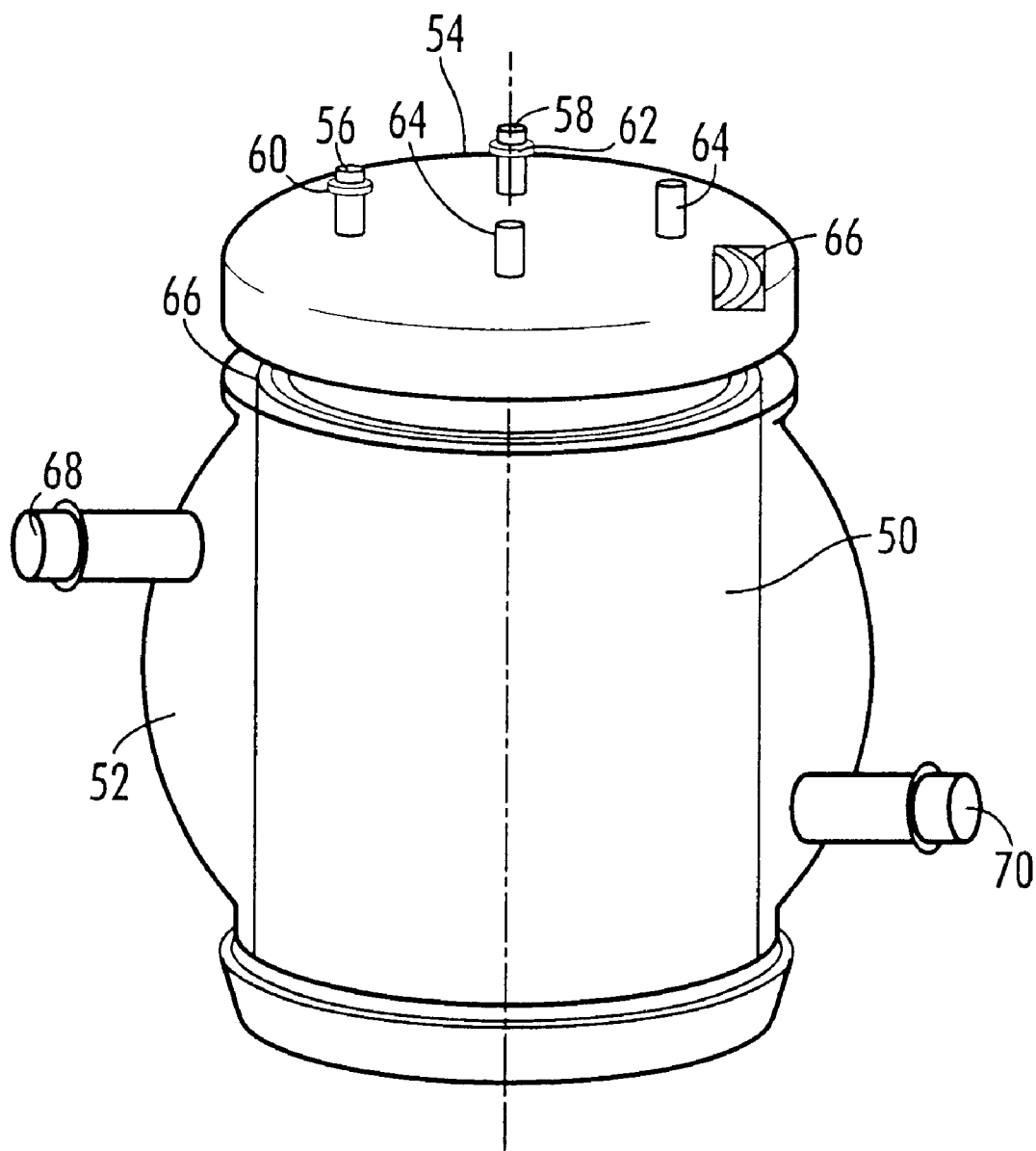
FIG. 12 is a schematic of a 1.5 L reaction vessel and cover plate.

The 1.5 L reaction vessel is of similar design (FIG. 12). There is a cover plate 54 with multiple ports, a gas inlet 56 having o-ring 60, a gas outlet 58 having o-ring 62 and solution injection/extraction 64. The cover plate 54 is sealed when positioned on the reaction vessel 50. FIG. 12 shows an o-ring 66 between the cover plate 54 and the reaction vessel 50. There is a thermal heating system applied to the exterior as the outer core vessel 52. The outer core vessel 52 has a thermal heating jacket inlet 68 and a thermal heating jacket outlet 70. FIG. 13 shows that the 1.5 L reaction vessel design 50 consists of an internal stirring blade system 76 that is connected to an external motor 78. The stirring blades 76 are fixed to a drive shaft 74. The drive shaft 74 is passed through a liquid/gas impermeable seal system constructed of Teflon and rubber (not seen in the figure). The liquid/gas seal and bearing assembly is fixed (pressed) in to the machined bearing-housing assembly 72. The bearing-housing assembly 72 is securely fastened to the upper scale reaction vessel 50. The external end of the drive shaft 74 is connected to the motor 78, which can be operated at selected velocities. The overall hydrogen production system and process comprise purging gas (e.g. helium) 1 flowing into the reaction vessel 50 through a gas inlet 56, the reaction vessel having an outer core vessel 52, the metal catalyst 3 and the degassed aqueous organic acid solution 5 within the reaction vessel reacting thus generating hydrogen, the purging gas and generated hydrogen gas flowing out through the gas outlet 58 to a hydrogen collection device or apparatus 84. The purging gas 1 is controlled by the on/off valve 82. The method supporting the hydrogen production is the same as previously described, minus the carrier gas (EXAMPLE 1). The hydrogen produced in the reaction was collected and analyzed.

Hydrogen was collected at a maximum rate of 3.4 ml/min for a total yield of 589 ml, collected for 52.5 hours. Additionally, the gas analysis indicates that the hydrogen was the only gas produced. For all experiments and EXAMPLES, iron powder was purchased from Aldrich (Milwaukee, Wis.), gluconic acid was from Sigma Chemical Co. (St. Louis, Mo.) and molecular sieves from Aldrich (Milwaukee, Wis.).

EXAMPLE 1

Using the above described apparatus with a 1.5 L reaction vessel, 5 g of iron powder was reacted with 1 L degassed 0.5 M gluconic acid at pH 7.4 and 80° C. Constant stirring took place at 400 rpm. No carrier gas was used.

Other Alternative Embodiments

The metal catalyst can also be fixed to a surface within the reaction vessel, then the acid solution is forced over the catalyst at various rates. Also, the catalyst can be applied as a solid, such as a wire or mesh type system. These are examples of ways to reduce the amount of metal catalyst suspended in solution during the stirring process.

In addition, scaling the reaction vessel size in order to contain more organic acid solution and/or catalyst may increase the rate of hydrogen production. Alternatively, the increase in hydrogen production could come from modular reaction vessels, several small reactors connected together. The concept of scaling is to design a self-sustaining system for the production of hydrogen gas. Another version includes the use of a designed turbine that operates under anaerobic conditions at 1500–2500 rpm. The turbine contains the metal catalyst and the organic acid solution.

Application of Hydrogen Production

Applying the hydrogen produced utilizes the 15 ml reaction vessel and replaces the tin dioxide hydrogen sensor with a small hydrogen fuel cell. The conversion of generated hydrogen into useable energy has been successfully completed, see EXAMPLE 2, FIG. 14a and FIG. 14b.

EXAMPLE 2

Figure 14A:
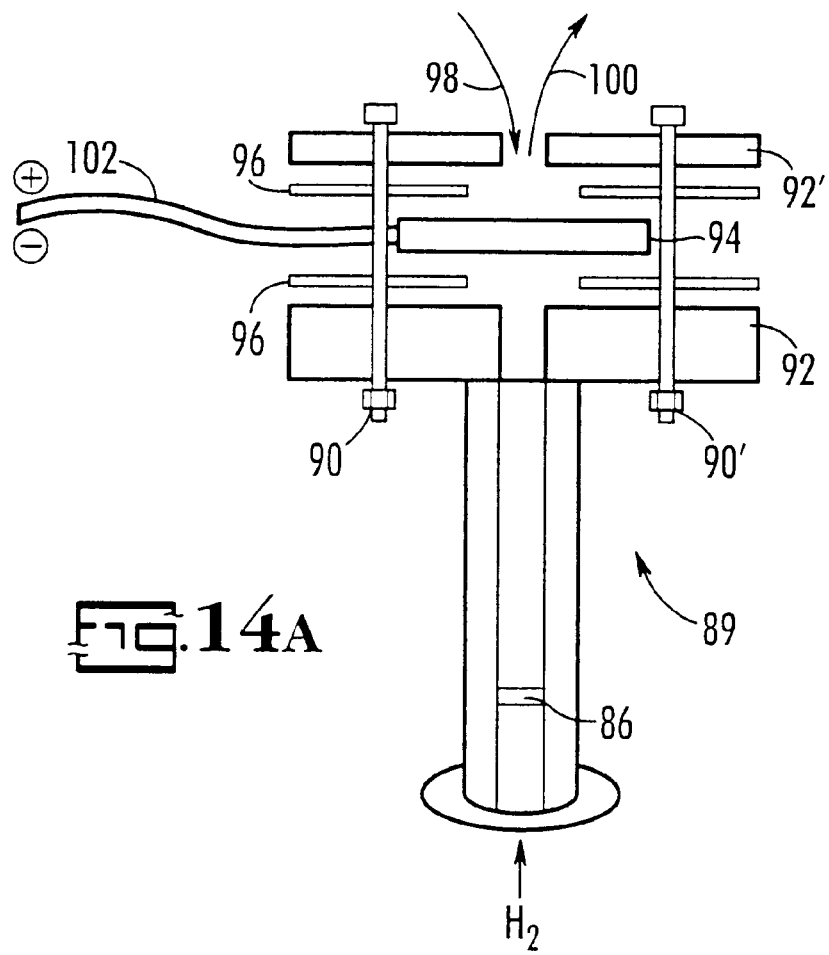
FIG. 14a shows a fuel cell housing assembly from the front view.
Figure 14B:
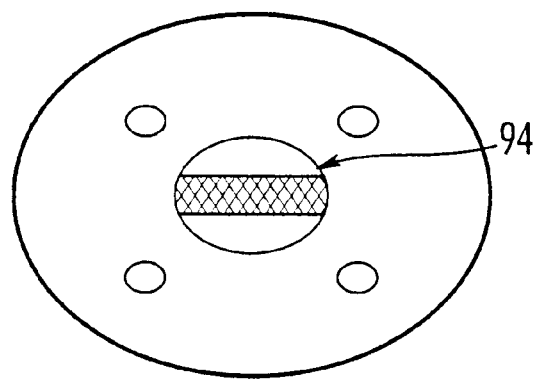
FIG. 14b shows the fuel cell housing assembly from the top view.
Figure 15:
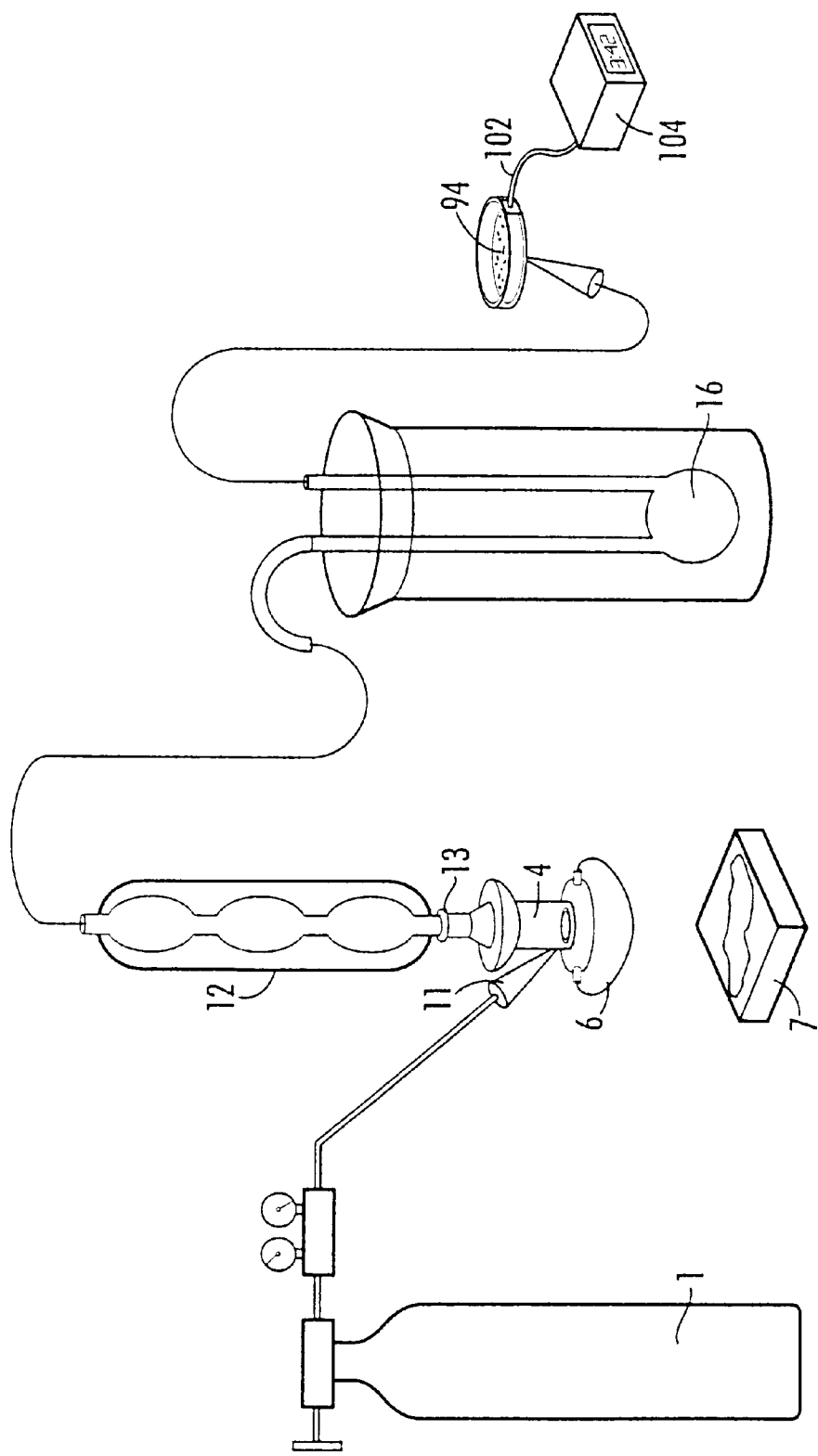
FIG. 15 is an apparatus for hydrogen gas conversion to electrical energy (fuel cell with clock).

A housing device 89 was designed and assembled specifically for the fuel cell 94, see FIG. 14a (front view). The hydrogen gas flowed into the housing device 89 first passing through a glass frit 86. The housing device 89 comprised a first glass disc 92 and a second glass disc 92' with a fuel cell 94 sandwiched in between the two glass discs 92 and 92'. Rubber seals 96 were placed between the glass discs 92, 92' and the fuel cell 94. The housing device 89 was held together by lock-down bolts 90 and 90'. The housing device 89 had a gas inlet for atmospheric oxygen 98 and a gas outlet for the excess hydrogen gas 100 that can be used to be recycled back to the reaction step in the reaction vessel. The housing device 89 was connected to a digital clock by wire 102. FIG. 14b shows a top view of the fuel cell 94, 5 mm in diameter. In FIG. 15, it can be seen that the hydrogen fuel cell 94 was connected to the reaction system after the liquid nitrogen gas trap 16, in place of the hydrogen sensor. FIG. 15 illustrates the helium carrier gas 1 flowed into the gas inlet 11 into the reaction vessel 4, FIG. 15 also showing the thermal loop 6. The gas then flowed through the gas outlet 13 into the condenser 12 into the liquid nitrogen gas trap 16 and into the fuel cell 94. The fuel cell 94 generated current which was carried by wire 102 to the digital clock 104. The digital clock 104 operated on 5 $\mu$amp. The reaction started with 265 mg iron reacted with 15 mL degassed 0.5 M gluconic acid, pH 7.2 at 80° C. with stirring at 400 rpm, helium carrier gas was flowing at a rate of 5 mL/min. The digital clock was powered for 32 consecutive days, after which the rate hydrogen production decreased below that which would sustain powering the clock.

While there has been shown and described what are at present considered the preferred embodiments of the invention, it will be obvious to those skilled in the art that various changes and modifications can be made therein without departing from the scope of the invention defined by the appended claims.

What is claimed is:

1. A method for the continuous production of hydrogen comprising the steps of:

a) providing a reaction vessel adapted for supporting and maintaining an anaerobic environment;

b) providing a metal catalyst;

c) providing a degassed aqueous organic acid solution at a concentration sufficient enough and in an amount sufficient enough to allow said metal catalyst to oxidize to form metal oxide while generating hydrogen upon reacting said metal catalyst with the water component of said aqueous organic acid solution, and said aqueous organic acid solution at a concentration sufficient enough and in an amount sufficient enough to reduce said metal oxide thereby regenerating said metal catalyst;

d) generating hydrogen by reacting said metal catalyst with said degassed aqueous organic acid solution in said reaction vessel under anaerobic conditions at a constant temperature of $\leq 80°$ C. at a pH ranging from about 4 to about 9, wherein said reaction forms said metal oxide and generates said hydrogen and wherein the organic acid component of said aqueous organic acid solution reduces said metal oxide thereby regenerating said metal catalyst and producing water, thus permitting said oxidization and reduction to reoccur in a continual reaction cycle.

2. The method of claim 1 further comprising the step of collecting said hydrogen generated in a collection vessel.

3. The method of claim 2 further comprising the steps of detecting said collected hydrogen and analyzing said collected hydrogen.

4. The method of claim 1 further comprising the step of feeding said generated hydrogen to an energy-producing device as a fuel to enable said energy-producing device to produce energy thereby enabling said energy-producing device to be a power source.

5. The method of claim 4 wherein said energy-producing device is a heat engine or a fuel cell.

6. The method of claim 1 wherein said metal catalyst is iron, aluminum, tin, copper or nickel.

7. The method of claim 6 wherein said metal catalyst is iron.

8. The method of claim 1 wherein said metal catalyst is a solid.

9. The method of claim 8 wherein said solid is a wire, chips, shavings, filings, powder or a mesh.

10. The method of claim 8 wherein said solid is fixed to a surface within said reaction vessel.

11. The method of claim 1 wherein said organic acid is ascorbic acid, gluconic acid, acetic acid, oxalic acid, citric acid or succinic acid.

12. The method of claim 11 wherein said organic acid is gluconic acid at a concentration ranging from about 0.5 to about 1.0 M.

13. The method of claim 1 wherein said organic acid is continually fed into said reaction vessel to sustain said reaction cycle for the continuous and sustained production of hydrogen.

* * * * *